United States Patent
Sembroski et al.

(10) Patent No.: US 8,972,531 B2
(45) Date of Patent: Mar. 3, 2015

(54) METHODS AND SYSTEMS OF RETRIEVING SEISMIC DATA BY A DATA SERVER

(75) Inventors: Charles M. Sembroski, Katy, TX (US); Scott D. Senften, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 91 days.

(21) Appl. No.: 13/884,004

(22) PCT Filed: Aug. 30, 2012

(86) PCT No.: PCT/US2012/053020
§ 371 (c)(1),
(2), (4) Date: May 8, 2013

(87) PCT Pub. No.: WO2014/035391
PCT Pub. Date: Mar. 6, 2014

(65) Prior Publication Data
US 2014/0181264 A1  Jun. 26, 2014

(51) Int. Cl.
*G06F 15/16* (2006.01)
*H04L 29/08* (2006.01)
*G01V 1/22* (2006.01)
*G06F 12/00* (2006.01)

(52) U.S. Cl.
CPC . *H04L 67/06* (2013.01); *G01V 1/22* (2013.01)
USPC .......................................... 709/219; 709/203

(58) Field of Classification Search
CPC ....................................................... G01V 1/30
USPC .................. 709/203, 217–219, 223–229, 250
See application file for complete search history.

(56) References Cited

U.S. PATENT DOCUMENTS

| | | |
|---|---|---|
| 6,493,635 B1 | 12/2002 | Bevc et al. |
| 7,031,842 B1 | 4/2006 | Musat et al. |
| 7,098,908 B2 | 8/2006 | Acosta et al. |
| 7,248,258 B2 | 7/2007 | Acosta et al. |
| 7,502,026 B2 | 3/2009 | Acosta et al. |
| 7,721,157 B2 | 5/2010 | Spitz et al. |
| 8,589,550 B1 * | 11/2013 | Faibish et al. ................. 709/226 |

(Continued)

FOREIGN PATENT DOCUMENTS

WO   2012-096659 A1   7/2012

OTHER PUBLICATIONS

International Search Report and Written Opinion issued Jan. 30, 2013 in International Patent Application No. PCT/US2012/053020, filed Aug. 30, 2012.

(Continued)

*Primary Examiner* — Zarni Maung

(57) ABSTRACT

Retrieving seismic data by a data server. At least some of the illustrative embodiments are methods including: retrieving a seismic data slice from a seismic data volume, the datums logically organized in parallel layers, the retrieving by: sending a request for the seismic data slice from a client computer to a data sever over a network connection, the request spans at least a quarter of the layers in the seismic data volume, and the data server is remote from the client computer; extracting data values associated with the seismic data slice from the seismic data volume by the data server; sending, by the data server, datums residing within the seismic data slice, the sending such that at least some cache lines of a processor of the client computer filled responsive to the request comprise datums that span more than one layer; and then rendering the seismic data slice on a display device.

9 Claims, 10 Drawing Sheets

(56) References Cited

U.S. PATENT DOCUMENTS

| | | |
|---|---|---|
| 2008/0231630 A1 | 9/2008 | Shenkar et al. |
| 2009/0006317 A1* | 1/2009 | Roth et al. .......................... 707/2 |
| 2011/0044532 A1* | 2/2011 | Holl et al. ..................... 382/154 |
| 2011/0078373 A1 | 3/2011 | Hoffman et al. |
| 2012/0316785 A1* | 12/2012 | Liu et al. .......................... 702/2 |
| 2012/0316850 A1* | 12/2012 | Liu et al. .......................... 703/6 |

OTHER PUBLICATIONS

NetApp. Industry Solution: Optimized Data Management for Upstream Oil and Gas. NetApp, 2009.

* cited by examiner

[HEADER][CORNER1,CORNER2,CORNER3][FOOTER]

[HEADER][CORNER1,CORNER2,α][FOOTER]

[HEADER][CORNER,α,β][FOOTER]

[HEADER][DATUM1,DATUM2,DATUM3....DATUMN][FOOTER]

METHODS AND SYSTEMS OF RETRIEVING SEISMIC DATA BY A DATA SERVER

BACKGROUND

Hydrocarbon recovery relies, in part, on the analysis of large volumes of digital seismic data. Renderings of these seismic data volumes may be used to aid in decision-making by providing geologists a visual tool to analyze hydrocarbon bearing formations.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Remote," in relation to a distance between a first device and a second device, shall mean that the first device is 10 meters or more from the second device.

"Layers," in relation to logical organization of a seismic data volume, shall not imply any particular orientation. Layers of a seismic data volume may be, for example, vertically stacked layers, horizontally stacked layers, horizontally stacked traces, or vertically stacked traces.

"Substantially," in relation to identity of data in a cache line, shall mean that 90% or more of the data meet the recited criteria.

"Slice" shall refer to a request for data spanning multiple layers of a seismic data volume, where the data are simultaneously displayed. Breaking an overall request for a slice into multiple sub-slices shall not obviate the status of the overall request as a "slice." Stated otherwise, data from multiple contiguous slices simultaneously displayed shall be considered a "slice."

"Interactive frame rate" shall mean that video frames are rendered at a rate of 10 frames per second or greater.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to requesting a graphical section (i.e., a seismic data slice) of a seismic data volume in such a way that cache misses associated with retrieving the data are reduced. In order to more fully describe the methods and systems, the specification first turns to a high level description of an example computer system.

Computer System Environment

Figure 1:
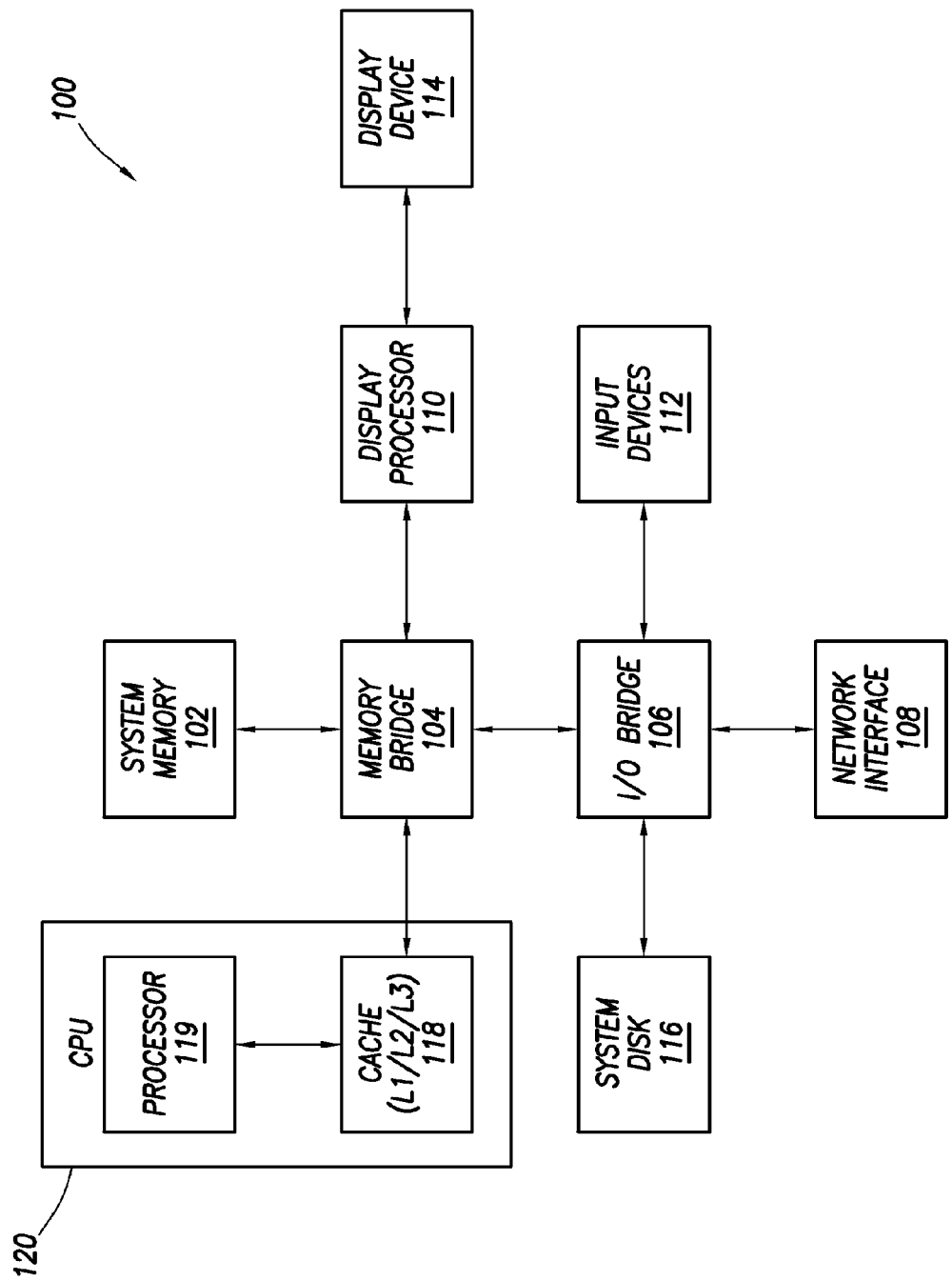
FIG. 1 shows a computer system in accordance with at least some embodiments.

FIG. 1 shows, in block diagram form, a computer system 100 in accordance with at least some embodiments. In particular, computer system 100 comprises a central processing unit (CPU) 120 coupled to a system memory 102. CPU 120 may comprise a processor core 119 (hereafter just "processor 119"), or the CPU 120 may implement multiple processor cores. Furthermore, computer system 100 may implement multiple CPUs 120.

System memory 102, which is connected to CPU 120 by way of memory bridge 104, functions as the working memory for the CPU, and comprises a memory device or array of memory devices in which programs, instructions and data are stored. System memory 102 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). System memory 102 is an example of a non-transitory computer-readable medium storing programs and instructions, and other examples of a non-transitory computer-readable medium may include disk drives (e.g. hard drives or solid-state drives) and flash memory devices.

Memory bridge 104 is also connected to an input/output (I/O) bridge 106 via a bus or other communication path. The I/O bridge 106 controls many computer system functions, such as interfacing with various input devices 112, (e.g., a keyboard, mouse, game controller, serial ports, floppy drives, and disk drives). Further, I/O bridge 106 may be coupled to a network interface 108, which enables computer system 100 to communicate with other computer systems via an electronic communications network, and may include wired or wireless communication over local area networks, wide area networks, and/or the Internet. Other components, including universal serial bus (USB) ports or other communication port connections (e.g., RS323, RS485, Firewire) may also be supported by the I/O bridge 106.

The computer system 100 further comprises a display processor 110 which, in the example system of FIG. 1, is coupled to the memory bridge 104. In one embodiment, display processor 110 is a graphics subsystem that includes at least one graphics processing unit (GPU) and graphics memory. Display processor 110 couples to display device 114 which may comprise any suitable electronic display device upon which an image or text can be plotted and/or displayed. The graphics processing unit (which may be part of display processor 110) may comprise an onboard processor, as well as onboard memory (not shown as to not unduly complicate the figure). The onboard processor may perform graphics processing, as commanded by CPU 120. Moreover, onboard graphics memory may be significant, on the order of several hundred megabytes or more. Thus, once commanded by the CPU 120, the display processor 110 may perform significant calculations regarding graphics to be displayed on the display device 114, and ultimately display such graphics, without further input or assistance of the CPU 120.

System disk 116 is coupled to I/O bridge 106 and may be configured to store content, applications, and data for use by CPU 120. System disk 116 provides non-volatile storage for applications and data and may include fixed or removable hard disk drives, flash memory devices, and other magnetic, optical, or solid state storage devices.

Overview of Cache Operations

Still referring to FIG. 1, and returning to CPU 120, the CPU 120 comprises a cache 118 coupled between the processor 119 the system memory 102. A cache temporarily stores data values that may be repeatedly accessed by CPU 120 and may aid in decreasing data access times by avoiding, in some cases, having to access system memory 102 each time a data value is requested by a program executing on the processor. Each cache may be associated with a cache controller (not specifically shown) that manages the transfer of data between the system devices (e.g., system memory 102, system disk 116, network interface 108) and the cache 118. Although only one cache 118 is shown, multi-level cache hierarchies may exist within the CPU (e.g., L1, L2, and L3 caches). The memory locations within cache 118 are logically divided into groups, each group known as a "cache line," where a cache line is the collection of a given number of bytes of data.

When a request for data is made by a program executed on the processor 119, cache 118 may improve computer system performance in some situations by maintaining data that are statistically likely to be used by the processor 119. Stated otherwise, for some data types, when a request for a datum is made by a program, it is statistically likely that the program's subsequent request for a new datum will come from a memory location in close proximity (from an address standpoint) to the first datum (e.g., from contiguous or near-contiguous memory locations). Thus, though a program executed on the processor 119 may request only a single datum, the computer system 100 delivers an entire cache line of data to the cache 118, where the cache line includes the requested datum and additional data from memory locations just before and just after the requested datum.

Consider, as an example, that the system memory 102 stores a data structure of interest, and that no portion of the data structure resides in the cache 118. Further consider that a program executing on the processor 119 requests a single byte of the data (a first datum) from the data structure. When the program makes the request in this example, the cache controller searches the cache 118 and determines that the requested first datum does not reside in the cache 118—a cache miss has occurred. Based on the cache miss, the processor 119 enters a plurality of stall cycles regarding the program, while the cache controller flushes one or more unused cache lines (i.e., removes or otherwise invalidates one or more cache lines), and the cache controller issues a request to the memory controller in the memory bridge 104. The memory bridge 104, in turn, reads the system memory 102 and returns to cache 118 a cache line that contains not only the requested first datum, but also additional data from memory locations logically just before and just after the requested first datum. With a 64-byte cache line size, for example, 64 bytes may be fetched and returned as a cache line within in the cache 118. The requested first datum is then loaded into a register (not specifically shown) of the processor 119, and the program can continue processing.

Now consider that the program makes a second request for single byte of data (a second datum). If the second datum is found in the current cache line (a cache hit), the second datum can be loaded to a register of the processor 119 without the need of a read from system memory 102 and without the need to implement stall cycles by the processor 119 with respect to the program. Thus, depending on the type of data within the data structure and the progression of requests for the data made by a program executing on the processor 119, some time savings may be achieved by use of a cache system. However, if the requested second datum is not in the cache 118 (again a cache miss), then the process associated with a cache miss is again initiated, and ultimately a new cache line (e.g., 64 bytes of data) is loaded to the cache 118 so the processor can retrieve the requested second datum.

The processes described to this point have been in relation to reads of data from system memory 102; however, the cache 118 is used for all data reads by the programs executing on the processor 119, including reads from devices such as the system disk 116 and the network interface 108. Consider, for example, that the data structure is stored on the system disk 116 rather than the system memory 102, and that no portion of the data structure resides in the cache 118. Further consider that a program executing on the processor 119 requests a single byte of the data (the first datum) from the system disk 116. When the program makes the request in this example, the cache controller searches the cache 118 and determines that the requested first datum does not reside in the cache 118—a cache miss has occurred. Based on the cache miss, the processor 119 enters a plurality of stall cycles, while the cache controller flushes one or more unused cache lines (i.e., removes or otherwise invalidates one or more cache lines) and the cache controller issues a request to read the system disk 116. A firmware interface is invoked (e.g., the basic input/output system (BIOS), or the Extensible Firmware Interface (EFI)) to access and read the system disk 116. Much like reads from system memory, what is returned to the cache 118 in reads from the system disk 116 is not only the requested first datum, but also additional data from memory locations logically just before and just after the requested first datum—again a cache line of data. With a 64-byte cache line size, for example, 64-bytes may be fetched from the system disk 116 and returned as a cache line. The requested first datum is then loaded into a register (not specifically shown) of the processor 119, and the program can continue processing. As before, if a subsequent request is made for single byte of data (a second datum) and the second datum is found in the current cache line (a cache hit), the second datum can be loaded to a register of the processor 119 without the need of a read from system disk 102 and without the need to implement stall cycles by the processor 119 with respect to the program.

The same operational procedures are used by computer systems for reads of data from remote hard drives over the network interface 108 (i.e., the system disk of a remote computer system). Consider, as another example, that computer system 100 couples to a remote computer system having a system disk which stores the data structure, and that no portion of the data structure resides in the cache 118 of computer system 100. Further consider that the program executing on the processor 119 of computer system 100 requests a single byte of the data (the first datum) from the system disk of the remote computer system. When the program makes the request, the cache controller searches the cache 118 and determines that the requested first datum does not reside in the cache 118—again a cache miss has occurred. Based on the cache miss, the processor 119 enters a plurality of stall cycles, while the cache controller flushes one or more unused cache lines (i.e., removes or otherwise invalidates one or more cache lines) and the cache controller issues a request to read the system disk 116. A communications interface is invoked (e.g., instructions executing the application layer of the Open System Interconnect (OSI) model) to access and read the system disk of the remote computer system. Much like reads from system memory 102 and the local system disk 116, what is returned from the remote system disk to the cache 118 is an entire cache line of data which includes not only the requested first datum but also additional data from memory locations logically just before and just after the requested first datum. As before, if a subsequent request is made for single byte of data (a second datum) from the remote computer system and the second datum is found in the current cache line (a cache hit), the second datum can be loaded to a register of the processor 119 without the need of a read from system disk 102 and without the need to implement stall cycles by the processor 119 with respect to the program.

Thus, regardless of the location from which data is read (e.g., system memory 102, system disk 116, or a remote disk read by way of the network interface 108), at the hardware level more data than actually requested may be returned. Depending on the type of data within the data structure and the progression of requests for the data made by a program executing on the processor 119, some time savings may be achieved by use of a cache system. However, if the requested second datum is not in the cache 118 (again a cache miss), then the process associated with a cache miss is again initiated, and ultimately a new cache line (e.g., 64 bytes of data) is loaded to the cache 118 so the processor can retrieve the requested second datum.

The discussion above regarding cache misses and cache hits is simplified so as to provide a high level foundational overview for explanation of a particular problem (discussed more below) associated with cache memory operations and reads of data from very large data sets (e.g., seismic data volumes). It is noted that at the application program level, the operations described above may take place substantially transparently. That is, the application program executed on the processor 119 does not contain code to perform cache memory operations as the operations are inherent in currently available computer systems executing currently available firmware interfaces. The specification now turns to a description of seismic data volumes.

Organization of Seismic Data Volumes

Figure 2:
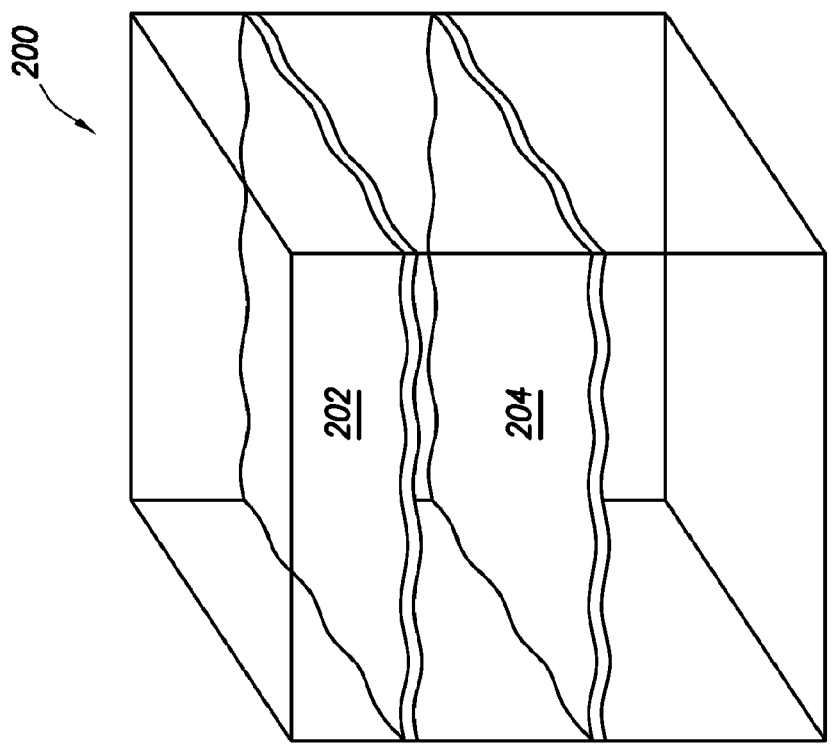
FIG. 2 shows a perspective view of a seismic data volume in accordance with at least some embodiments.

FIG. 2 shows a perspective view of a representation of a three-dimensional seismic data volume 200 of a hydrocarbon bearing formation. In example situations, seismic data volume 200 may have been created by way of a seismic survey. That is, a seismic survey (e.g., land-based survey, marine survey) may have been conducted to provide seismic mapping of the subsurface horizons of a hydrocarbon formation, resulting in seismic data volume 200. In the example of FIG. 2, two subsurface horizons 202 and 204 are shown, however the number of subsurface horizons is not limited to two, and any number of subsurface horizons may be possible within a seismic data volume. While FIG. 2 shows the example seismic data volume 200 as a continuous structure, the underlying data may be logically organized as a linear array of contiguous memory locations. The specification thus turns to linear arrays.

Figure 3:
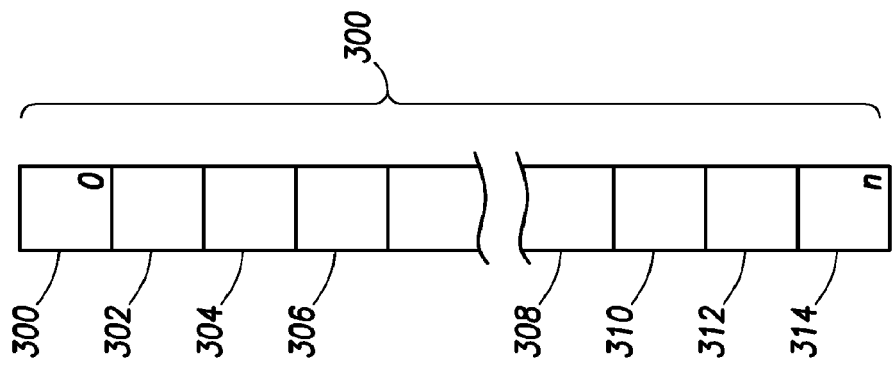
FIG. 3 shows a linear array of memory in accordance with at least some embodiments.

FIG. 3 shows a block diagram of a linear array 300. In particular, each block 300 through 314 may be a memory address in a linear sequence of memory addresses, with block 300 having a first memory address in the linear array (e.g., memory address "0") and block 314 having the last memory address in the linear array (e.g., the "nth" memory address). Although only nine blocks (and thus nine memory addresses or locations) are shown in FIG. 3, any number of contiguous memory addresses is possible. Associated with each memory address in the linear array is one piece of information (e.g., one byte). In the case of organizing data of a seismic data volume 200 as a linear array, the linear array may span on the order of 200 billion memory addresses, with each memory address storing data that represents a parameter of the hydrocarbon bearing formation (e.g., reflectivity of seismic signals). If each memory location is associated with a byte of data, the linear array may span 200 Giga-bytes in size.

Figure 4:
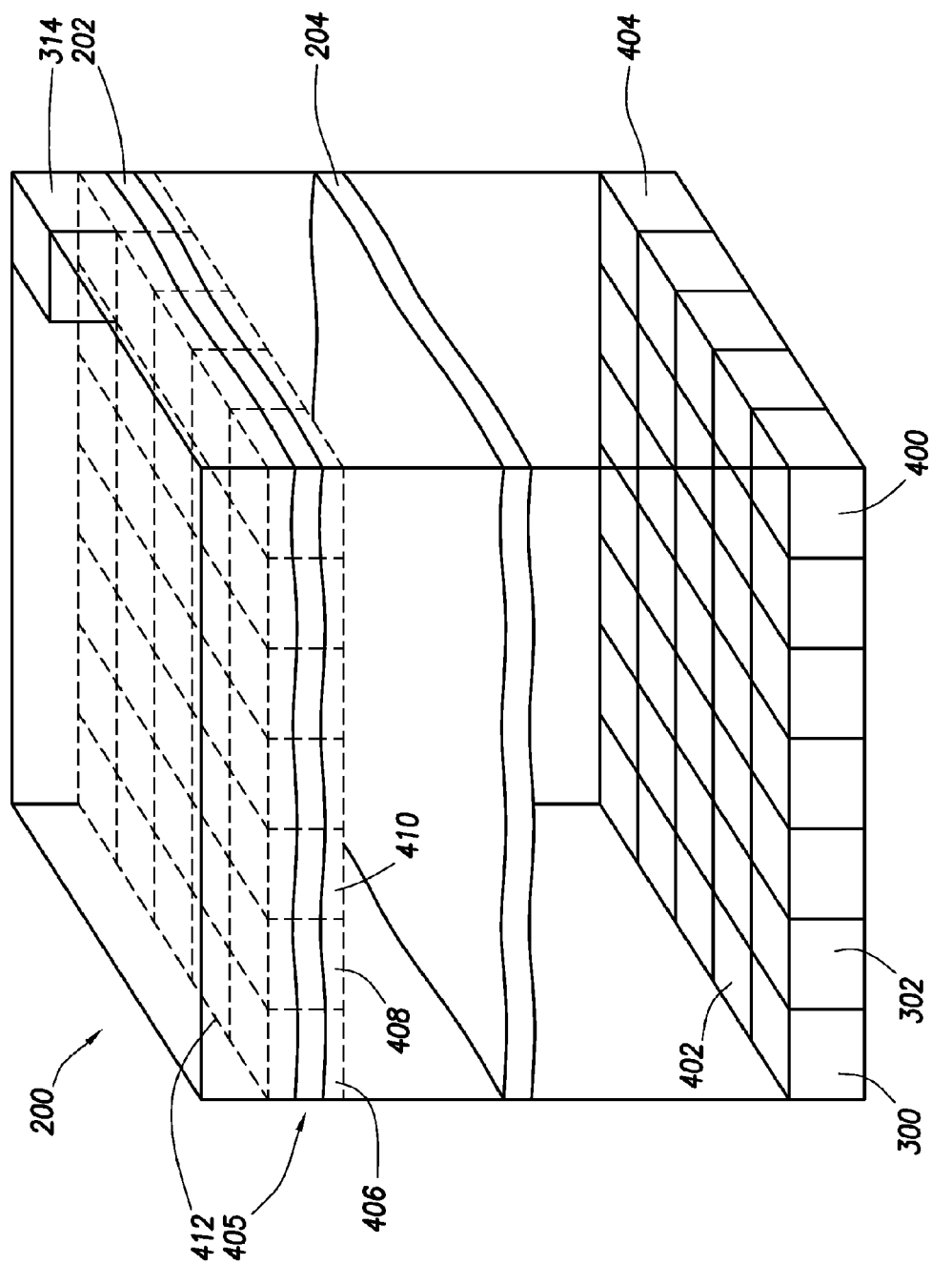
FIG. 4 shows a perspective view of a seismic data volume in accordance with at least some embodiments.

FIG. 4 shows a perspective view of the seismic data volume 200 partially divided into memory locations to show one example relationship between the three-dimensional representation of the seismic data volume 200 and storage as a linear array. Each memory location can thus be thought of as representing a small physical volume within the overall seismic data volume 200, and the data within the memory location representing the physical parameter of the formation within the small volume. However, in FIG. 4 only a few representations of the memory locations of the linear array have been illustrated so as not to unduly complicate the figure. In many cases, there is an organizational relationship between the sequence of memory locations in the linear array and the orientation of the seismic horizons (such as seismic horizons 202 and 204) in seismic data volume 200. More particularly, in example systems the sequence of memory locations of the linear array may be arranged in horizontal layers, and thus organizationally the horizontal layers reflect orientation of the seismic horizons within the seismic data volume (e.g., horizons 202 and 204).

In this example embodiment, the first memory location 300 (i.e., logically the first small physical volume) of the linear array may be assigned to a physical location at the bottom left corner in the view of FIG. 4. The next memory location 302 of the linear array logically abuts memory location 300 from an address perspective, and may be assigned to an abutting small physical volume. The assignment of abutting memory locations in the linear array to abutting small physical volumes continues along horizontally until the end of a row is reached, at the lower right corner 400. In some cases, the next memory location in the linear array is assigned to small physical volume 402, in this example on the left (abutting the small physical volume associated with memory location 300), and again continues along the horizontal row, and ultimately along all the small physical volumes in the level (in this example ending at block 404). The next memory location in the linear array is assigned to a small physical volume (not specifically shown) sitting directly on top of the small physical volume associated with memory location 300, and so on, ending with the small physical volume at the back right corner, in this example associated with memory location 314.

The example system of FIG. 4 is simplified for purposes of explanation. In practice, each horizontal layer may logically comprise many thousands or hundreds of thousands of small physical volumes, and thus many thousands or hundreds of thousands of memory locations. As mentioned, some basin-scale seismic data volumes (e.g., Gulf of Mexico) may span 200 Giga-bytes or more. Moreover, other organizational relationships of the small physical volumes (and thus the memory locations) are possible, such as vertical layers. Moreover, in other example systems the seismic data volume may be organized as layers of seismic traces (where each memory location is indicative an arrival time, and the value within the memory location indicative of amplitude at the arrival time). So as not to unduly complicate the description, the balance of the specification is based on memory locations corresponding to small physical volumes, but such shall not read as a limitation as the various aspects are likewise applicable to other "layered" organizational structures An example organizational relationship between the linear array, the small physical volumes, and the seismic horizons is illustrated in FIG. 4. In particular, the seismic horizon 202 aligns with a horizontal layer of small physical volumes (shown in dashed lines). While in the example situation the seismic horizon 202 is shown to reside fully within the horizontal layer of small physical volumes, this need not necessarily be the case in practice. Use of layering for the logical relationship of the small physical volumes, particularly horizontal layering, presents advantages in certain situations.

Situations when Cache Works Well

Consider now a situation where the seismic data volume 200 of FIG. 4 is contained within the system memory 102, and that a petrotechnical application (e.g., visualization program) running on the processor 119 is attempting to render a view being a slice through the volume 200 (that is, a seismic data slice). Further consider that a plane defining the seismic data slice resides substantially along the seismic horizon 202. In this example situation, the seismic data slice resides fully within a single horizontal layer, layer 405, of the seismic data volume 200. The petrotechnical application may thus make a request for a first datum (e.g., the data associated with memory location 406). The underlying computer system 100, however, reads enough data from the system memory 102 to fill entire cache line within the cache 118. For convenience, consider that the cache line contains the data associated with memory location 406, and also memory locations 408 and 410. When the petrotechnical application makes a subsequent request for the datum associated with memory location 408, by virtue of the cache operations the datum associated with memory location 408 is already present in the cache 118, and thus the read is performed very quickly. More generally, if a requested seismic data slice of the seismic data volume happens to reside in the same orientation as the orientation of which data is organized within the linear array (e.g., if the linear array represents data saved in horizontal layers), each cache line may contain several bytes that will ultimately be requested and thus the seismic data slice may be returned quickly and efficiently. The example situation discussed in this paragraph, unfortunately, rarely happens in practice when dealing with large seismic data volumes.

Cache Thrashing

Figure 5:
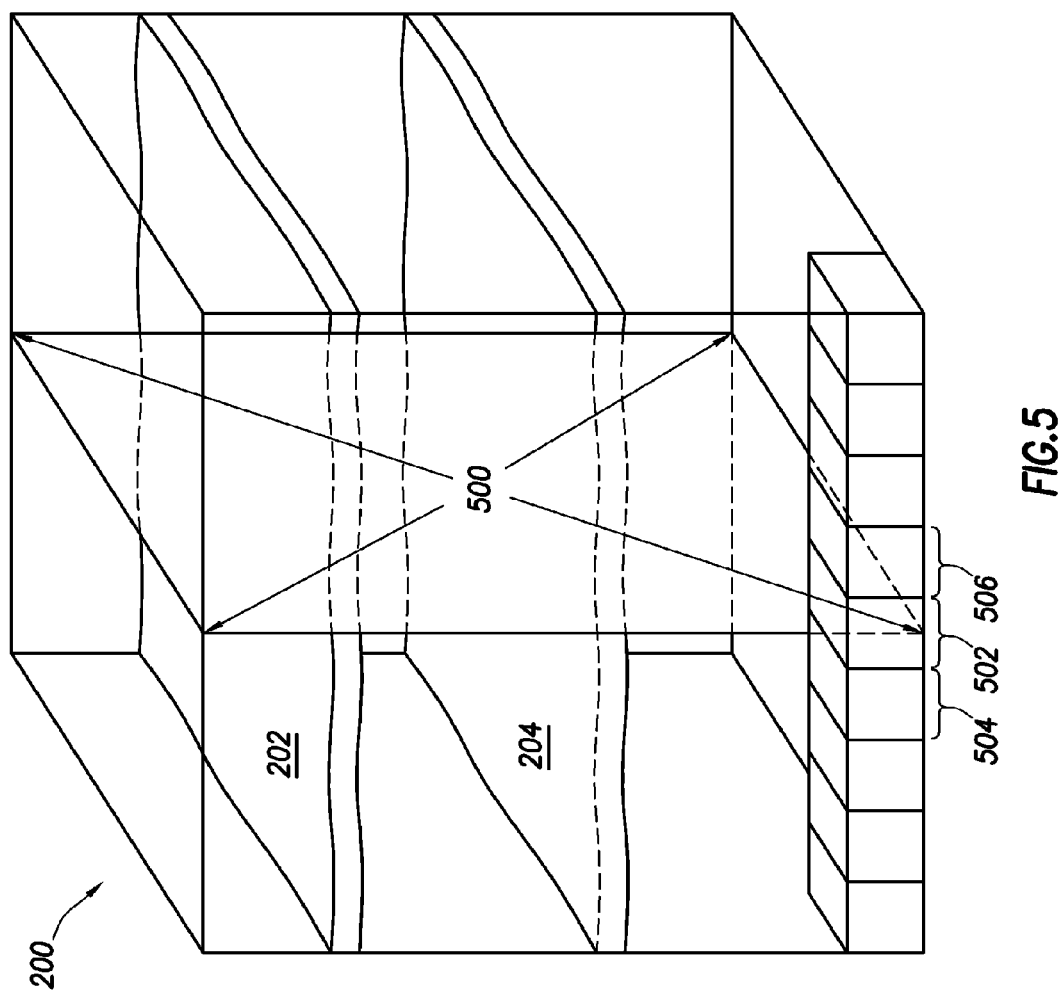
FIG. 5 shows a perspective view of a seismic data volume in accordance with at least some embodiments.

FIG. 5 shows a perspective view of the seismic data volume 200 in order to explain cache thrashing that arises in many situations when dealing with large seismic data volumes. In particular, FIG. 5 shows the seismic data volume 200, the example seismic horizons 202 and 204, and a plurality of memory locations associated with the seismic data volume. In most cases, the seismic data slices requested for rendering cut, or slice, through several of the seismic horizons in the seismic data volume. In the example case of FIG. 5, consider the seismic data slice 500 which spans more than half the layers in the seismic data volume 200 (and as illustrated, spans all the horizontal layers of the seismic data volume), as well as slicing through both the seismic horizons 202 and 204. If a request is made for the vertical slice 500 (perpendicular to seismic horizons 202 and 204), then each desired memory location will no longer be contiguous with the next desired memory location. For example, the petrotechnical application may request the datum associated with memory location 502, and the underlying computer system may return a cache line comprising the memory locations 502, 504, and 506. However, because of the orientation of the seismic data slice 500 with respect to the layers of the memory locations, the next datum that will be requested cannot reside within the cache. In the example situation of FIG. 5 with the seismic data slice 500 being perpendicular to horizontal layers of the memory locations, a new cache line of data will be needed for each and every datum that will make up the seismic data slice 500. In these situations cache operations become inefficient, and result in a significant number of cache misses—cache thrashing.

The process of returning a vertical seismic data slice when the memory locations storing the seismic data volumes are organized in horizontal layers is likely to be slow and inefficient. In cases where the seismic data volume is small enough to be stored in the system memory 102, in spite of the cache thrashing it may still be possible to deliver requested seismic data slices at an interactive frame rate. However, if the data size of the seismic data volume is too large to be wholly stored within the system memory 102 (e.g., a seismic data set representing the Gulf of Mexico), only portions of the seismic data set may be stored in system memory 102 at any one time, and thus reads from other locations (e.g., system disk 116 and/or remote disk accesses over network interface 108) may be required. Not only are the reads from the other locations slower than reads from system memory 102, but as discussed above, the use of cache for reads from the other locations also result in cache thrashing in the example situation of FIG. 5. Thus, rending of seismic data slices on the display device 114 at interactive frame rates is not possible in many situations in the related art when the seismic data set is larger than can be held within the system memory 102.

Data Server-Based Access to Seismic Data Volumes

Example System

Figure 6:
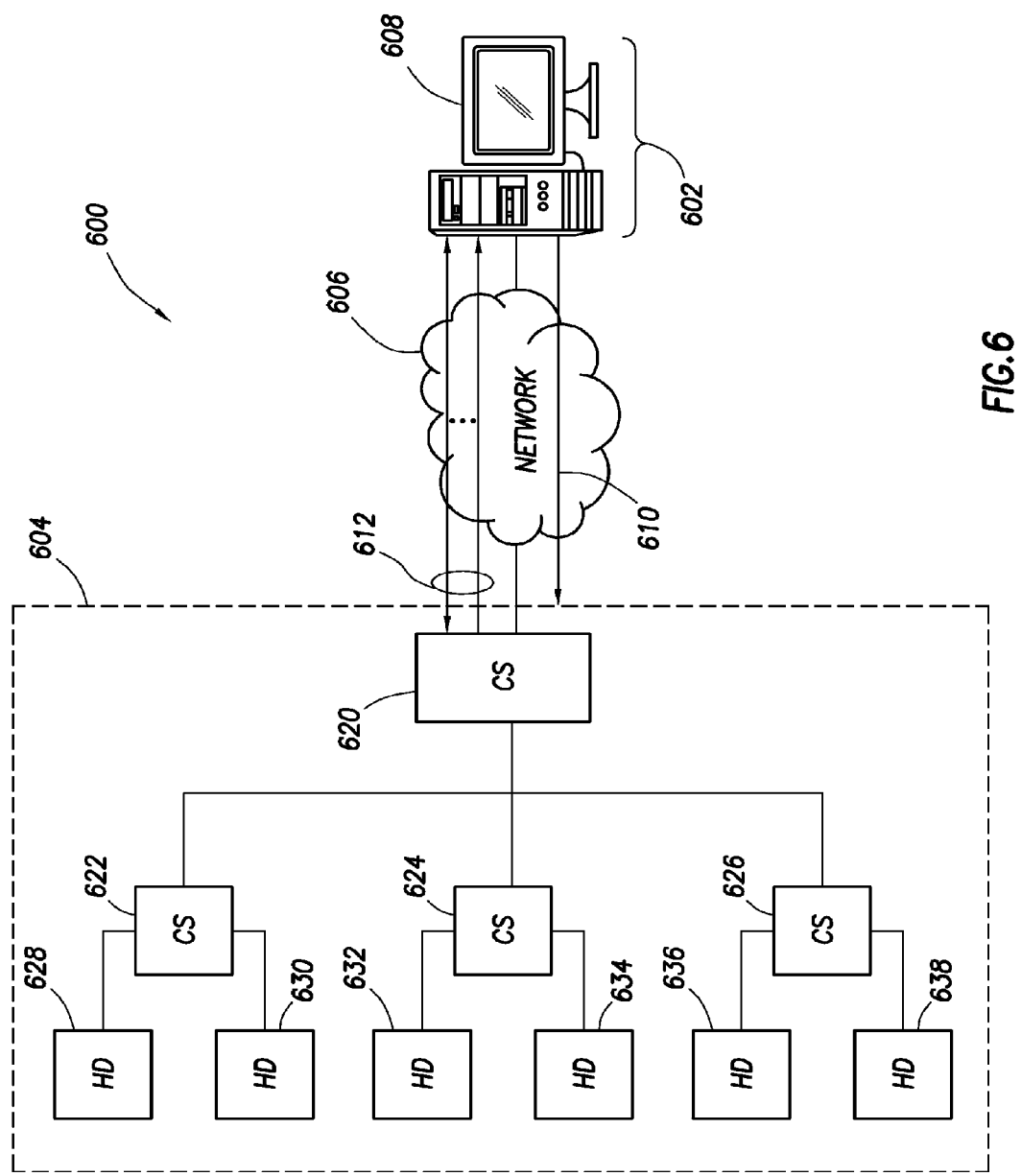
FIG. 6 shows a system in accordance with at least some embodiments.

FIG. 6 shows, in block diagram form, a system 600 in accordance with at least some embodiments. In particular, the system 600 comprises a client computer system 602 coupled to a seismic data server 604 by way of a network 606. The client computer system 602 may be any suitable computer system currently available and/or after-developed, including a computer system such as shown in FIG. 1. The network 606 may be any suitable network over which data communications can take place, such as a wired or wireless local area network, a wired or wireless wide area network, and/or the Internet. The seismic data server 604 holds one or more copies of a seismic data volume, and the seismic data server 604 may be any suitable arrangement of one or more computer systems operating in a manner discussed more below. A petrotechnical application executing on the client computer system 602 renders seismic data slices for viewing on the display device 608 by requesting data for the seismic data slice from the data server 604 over the network 606. A system 600 operated in conformance with the current specification, however, is able to deliver data associated with seismic data slices from the seismic data volume at interactive frame rates in spite of the remote location of the data server 604 from the client computer system 602, and in spite of the fact that any particular seismic data slice may span multiple layers of the organizational structure of the seismic data volume. The specification first turns to an example query format issued by the client computer 602 and sent to the data server 604, then to how data is returned from the data server 604 in response to the queries from the client computer 602, and finally to example systems of formulating the responses by the data server 604.

The Query

In accordance with example systems, the client computer 602 receives a request to view a seismic data slice. The request may be, for example, received from a geologist or reservoir engineer interacting with the client computer 602 by way of an input device (not specifically shown). From the request received, the client computer 602 formulates a query that defines the seismic data slice, and sends the query 610 as a packet-based message through the network 606. Unlike requests to read specific locations from a disk drive, a query 610 in accordance with example embodiments merely provides enough information to define a plane that represents the seismic data slice. Stated otherwise, the query provides information sufficient for the seismic data server 604 to determine the orientation of the seismic data slice through the seismic data volume.

Figure 7:
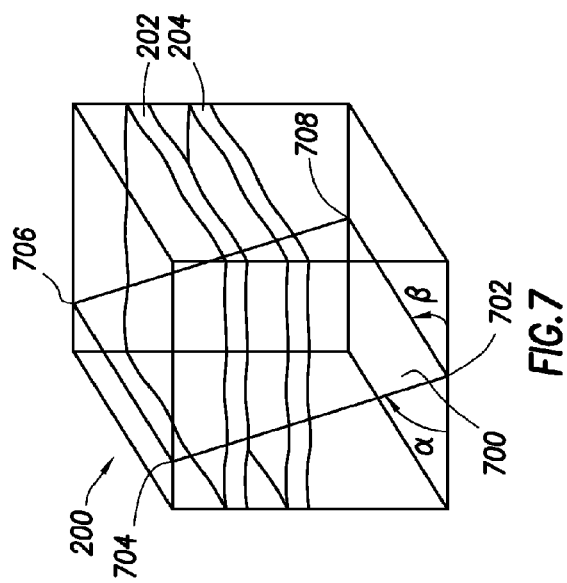
FIG. 7 shows a perspective view of a seismic data volume in accordance with at least some embodiments.

FIG. 7 shows a perspective view of seismic data volume 200. In particular, FIG. 7 shows the example seismic horizons 202 and 204, along with a seismic data slice 700 in the form of a plane. If the seismic data volume 200 is organized as horizontal layers (not specifically shown), the seismic data slice 700 thus spans more than half the layers. In accordance with example embodiments, the query 610 formulated by the client computer system 602 defines the example seismic data slice 700. In one example system, the seismic data sliced is defined by the query containing indications of the memory locations associated with at least three locations on the plane (e.g., three corners, such as corner 702, corner 704, and corner 706). From the indications of the memory locations defining at least three locations on the plane, the seismic data server 604 can ascertain the extent and location of the seismic data slice 700, and then the seismic data server can gather data from the seismic data volume. In a related example query, the query may contain an indication of memory locations that define the four corners of the seismic data slice 700 (that is, additionally including corner 708).

Figure 8:
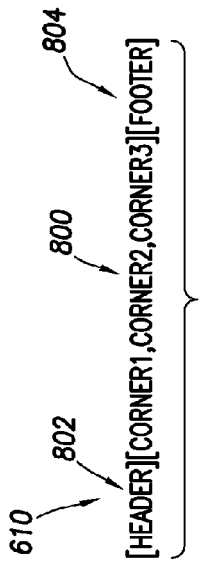
FIG. 8 shows a query format in accordance with at least some embodiments.

FIG. 8 shows a query format in accordance with at least some embodiments. In particular, FIG. 8 shows that in the example system of the query containing information regarding corners of the seismic data slice 700, the query 610 comprises a payload portion 800 within which indications of the corners are placed, along with a header portion 802 (e.g., packet message information, such as source address, destination address, IP address of the seismic data server), as well as footer portion 804 (e.g., checksum bits, error correction bits).

Returning to FIG. 7, other systems may be used in addition to, or in place of, representing the seismic data slice 700 by three or more locations on the plane. In particular, the example seismic data slice 700 forms an angle α with the lowest horizontal layer of the seismic data volume. Thus, in other cases the query may be formed by indication of any two locations on the plane (e.g., two corners, such as corner 702 and corner 708), along with an indication of the angle α that the seismic data slice makes with a predetermined feature of the seismic data volume 200 (in the example case of FIG. 8, the predetermined feature being the orientation of the lowest horizontal layer).

Figure 9:
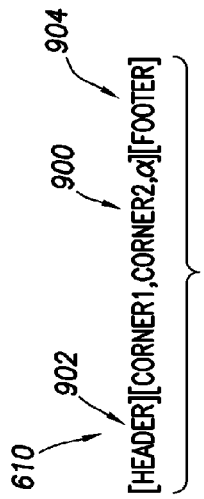
FIG. 9 shows a query format in accordance with at least some embodiments.

FIG. 9 shows a query format in accordance with at least some embodiments. In particular, FIG. 9 shows that in the example system of the query containing information regarding only two locations on the seismic data slice 700 and an indication of the angle the seismic data slice makes with a predetermined feature of the seismic data volume 200, the query 610 may comprises a payload portion 900 within which indications of the two example corners and the angle are placed, along with a header portion 902 as well as footer portion 904.

Returning to FIG. 7, other systems may be used in addition to, or in place of, representing the seismic data slice 700 by two or more locations. In particular, the example seismic data slice 700 forms not only an angle α with the lowest horizontal layer of the seismic data volume, but also an angle β with side of the seismic data volume. Thus, in other cases the query may be formed by indication of only one location on the plane (e.g., a corner, such as corner 702), along with an indication of the angle α that the seismic data slice makes with a first predetermined feature of the seismic data volume 200 (in the example case of FIG. 9, the predetermined feature being the orientation of the lowest horizontal layer) and an indication of the angle β that the seismic data slice makes with a second predetermined feature of the seismic data volume 200 (in the example case of FIG. 9, the second predetermined feature being the orientation of a side of the seismic data volume).

Figure 10:
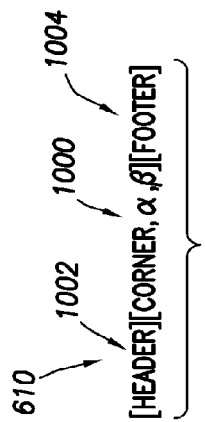
FIG. 10 shows a query format in accordance with at least some embodiments.

FIG. 10 shows a query format in accordance with at least some embodiments. In particular, FIG. 10 shows that in the example system of the query containing information regarding only one location on the seismic data slice 700, an indication of the angle the seismic data slice makes with a first predetermined feature, and the angle the seismic data slice makes with a second predetermined feature of the seismic data volume 200, the query 610 may comprises a payload portion 1000 within which indications of the corner and the angles are placed, along with a header portion 1002 as well as footer portion 1004.

Thus, instead of the client computer system 602 making multiple requests for bytes of data from a locally or remotely stored seismic data volume, and receiving multiple responses and cache lines in return, the client computer system 602 makes one request. As will be discussed more below, the seismic data server 604 extracts the requested data, and returns the data in full, as requested, to the client computer 602, rendering it on a display device. It is noted, however, that the while the example slice 700 spans the entire seismic data volume 200 in this example, slices need not be so expansive, and may span smaller portions (including portions that do not intersect the outer boundaries of the seismic data volume).

Query Response

The specification now turns to example systems of how the data associated with the seismic data slice is returned. Returning to FIG. 6, regardless of the precise format of the query 610, after the seismic data server 604 receives the query 610 the seismic data server 604 returns data from the seismic data volume that resides within (or near) the defined seismic data slice defined by the query. Because of the size of the seismic data volume and the size of most seismic data slices 700, the data that resides within the seismic data slice is returned as on or more responses 612 in the form of packet-based messages, as illustrated in FIG. 6 by responses 612. That is to say, in communicating by way of packet-based messages, the size of the response may be limited, and thus in delivering data associated with the seismic data slice, the data may be logically broken into a plurality of groups, with one group sent in each packet-based message.

Figure 11:
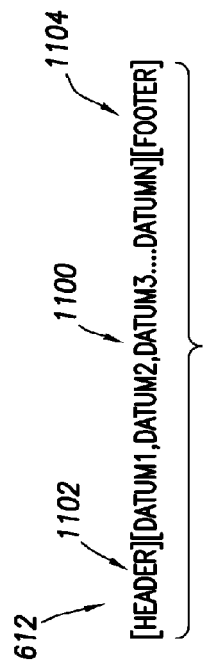
FIG. 11 shows an example response format in accordance with at least some embodiments.

FIG. 11 shows an example response format in accordance with at least some embodiments. In particular, FIG. 11 shows that in the example system each response 612 in the form of a packet-based message may comprise a payload portion 1100 within which a portion of group of the data that resides on the seismic data slice resides, along with a header portion 1102 (e.g., packet message information, such as source address, destination address, IP address of the client computer system, message packet number), as well as footer portion 1104 (e.g., checksum bits, error correction bits). Within the payload portion 1100 the data may be presented in any suitable fashion. As shown, the each datum (e.g., Datum1, Datum2 . . . DatumN) is presented in the payload portion 1100. As discussed with respect to cache operations above, the client computer system 608 provides the payload 1100 to the cache as one or more cache lines. Unlike related-art reads directly from the seismic data volume, the datums of the payload 1100 (and thus the resulting cache lines in the cache 118) span more than one logical layer of the seismic data volume. In many situations (particularly the example of the seismic data slice 700 of FIG. 7), the datums of the payload 1100 may span two or more layers of the seismic data volume 200. Further still, because the seismic data server 604 in many example systems extracts only the datums relevant to the seismic data slice 700, the cache lines created by the payload of the responses 612 may comprise substantially only datums associated with the seismic data slice.

The precise mechanism by which the datums are organized in the payload portion 1100 across the multiple responses 612 may be determined in advance. For example, Datum1 in FIG. 11 may represent the datum associated with a small physical volume at corner 702, Datum2 may represent the datum associated with a small physical volume abutting (horizontally) the small physical volume at corner 702, and so on along a horizontal path progressively from the lowest horizontal row to the upper most horizontal row. Thus, in this example, the last datum of the last response 612 would be the datum associated with a small physical volume associated with corner 706. However, any preselected arrangement that relates datums to physical volumes along the seismic data slice may be used.

Example Seismic Data Server

Referring again to FIG. 6, FIG. 6 shows an example system to implement the seismic data server 604. In the example system, the seismic data server 604 comprises a plurality of computer systems (illustratively four computer systems 620, 622, 624, and 626), as well as a plurality of disk drives. In the example system, there are two disk drives associated each of the three of the four computer systems. For example, computer system 622 has associated therewith two storage systems, in the example hard disk drives 628 and 630. Computer system 624 has associated therewith two storage systems, in the example hard disk drives 632 and 634. Computer system 626 has associated therewith two storage systems, in the example hard disk drives 636 and 638. The storage systems may be hard drives as shown, or may be any type of long term storage device such as, but not limited to, solid state drives and optical systems. Moreover, each storage system may itself comprise multiple components. For example the storage system in the form of hard disk drive 628 may itself be a redundant array of inexpensive (or independent) disks (RAID) system. The example hard disk drives may couple to their respective computer systems using any suitable communication system and hardware (e.g., serial AT attachment (SATA) connections).

The computer systems 620, 622, 624, and 626 may be communicatively coupled by any suitable system, such as a LAN, WAN, and/or the Internet. That is, while in many cases the computer systems 620, 622, 624, 626 may be located at the same physical location (e.g., in the same data center), having the computer systems 620, 622, 624, and 626 in the same physical location is not required, and the computer systems of seismic data server 604 may themselves be remotely located from each other.

Although there are several example variations of how the seismic data server 604 may store a seismic data volume, consider a first example in which each hard drive stores a portion of the seismic data volume, and where the computer system 620 has knowledge of where each portion of the seismic data volume is stored (e.g., on which specific hard drive). Thus, in this example situation, a 200 Giga-byte seismic data volume may be broken into six 33 Giga-byte portions, with each of the example hard disk drives 628-638 mutually exclusively storing an individual 33 Giga-byte portion.

In the example system of FIG. 6, the computer system 620 of the overall seismic data server 604 receives the query 610 from the client computer system 602. Based on the data within the payload portion of the query 610, the computer system 620 ascertains the orientation of the seismic data slice 700, and then the computer system 620 reads data groups from the seismic data volume. In the example case where the seismic data volume is spread across the hard disk drives 628-638, the computer system 620 creates a plurality of read requests, and sends the read requests to the appropriate computer system 622, 624, and 626. In the example system, each read request is to read a particular memory location in the linear array of memory locations; however, what the computer system 620 gets in reply is (as discussed with respect to cache operations) an entire cache line of data that comprises not only the requested datum, but also datums that do not reside in the seismic data slice. Thus, for each data group read, the computer system 620 saves the requested datum, and discards the plurality of datums that do not reside in the seismic data slice. In some cases, discarding is performed inherently as a subsequent cache miss.

The example steps of saving the requested datum, and discarding the rest, are repeated until each datum associated with the seismic data slice is received. Thereafter, the computer system 620 assembles a plurality of responses 612 (with the respective payloads of each response holding at least a portion of the datums associated with the seismic data slice), and sends the response 612 to the client computer system 602. In some cases, the computer system 620 may begin sending the responses 612 before completely assembling the data associated with the seismic data slice. For example, if the payload is of limited size, as soon as a sufficient number of data have been received, a first response 612 can be sent.

In yet still other cases, rather than the computer system 620 making requests for individual bytes from each of the computer systems 622, 624, and 626, the computer system 620 may instead forward the query that defines the seismic data slice (including, for example, the three or more corners) to each computer system 622, 624, and 626. In these example embodiments, each respective computer system 622, 624, and 626 determines which portions (if any) of the seismic data slice reside in the portions of the overall seismic data volume contained in the locally attached storage devices. Thus, in these embodiments computer systems 622, 624, and 626 perform the example steps of saving requested datums, and discarding the rest. The computer system 620 receives packet-based messages containing datums that reside in the seismic data slice, and the computer system 620 may aggregate the data to generate responses 612.

Before turning to other example systems for storing the seismic data volume by the seismic data server 604, a few points are in order. In the example system of FIG. 6, if the storage system within which the seismic data volume was stored was connected locally to the computer system 620, there would likely be no net gain in speed of access as compared to storing the seismic data volume locally within the client computer system 602. However, by having the work of gathering the data of the seismic data slice 700 by a plurality of computer systems within the seismic data server 604, the cache thrashing issues are not resolved (at the seismic server 604 end), but the parallel processing of requests in combination with a delivery technique that reduces or obviates cache thrashing in the client computer 602 results in a system where the seismic data slices may be rendered at interactive frame rates on at the client computer system 602 in spite of cache thrashing issues that may exist at one or more levels of the seismic data server 604.

In the example system of the seismic data server 604 discussed to this point, each hard disk 628-638 stored a mutually exclusive portion of the seismic data volume 200. However, in yet still other cases, possibly for redundancy of access, each hard disk 628 could store a complete copy of the seismic data volume 200. In this example system, the computer system 620 may formulate reads for data groups, and scatter those reads in any suitable fashion to the downstream computer systems 622, 624, and 626. Thus, for example, if computer system 622 fails, the overall seismic data server 604 may still be operational, with the computer system 620 directly all data requests to just the computer systems 624 and 626.

Finally, the example seismic data volume 200 discussed to this point has been described as a linear array of memory addresses logically organized as horizontal layers. However, such an organizational structure is merely illustrative. The same overall seismic data volume 200 may likewise be logically organized as vertical layers, or layers of any orientation. In situations where seismic data slices of larger vertical orientation are expected, the logical orientation of the seismic data volume 200 may be stored as vertical layers, such that reads by the computer systems 622, 624, and 626 may take advantage of the receiving multiple bytes of data in each cache line, and thus passing multiple bytes of data back to the computer system 620. In such a system, where the seismic data slice 700 substantially matches a vertically oriented logical layer, the frame rate achievable at the client computer system 602 may be increased.

In yet still further example systems, some of the hard disks may store versions of the seismic data volume 200 logically organized as horizontal layers, and some of the hard disks may store versions of the seismic data volumes 200 organized as vertical layers, and the computer system 620 may select to which computer systems 622, 624, and 626 from which to read data groups that takes advantage of the of the correspondence between the orientation of the seismic data slice and the logical organization of the layers of the versions of the seismic data volumes.

Second Example Seismic Data Server

Figure 12:
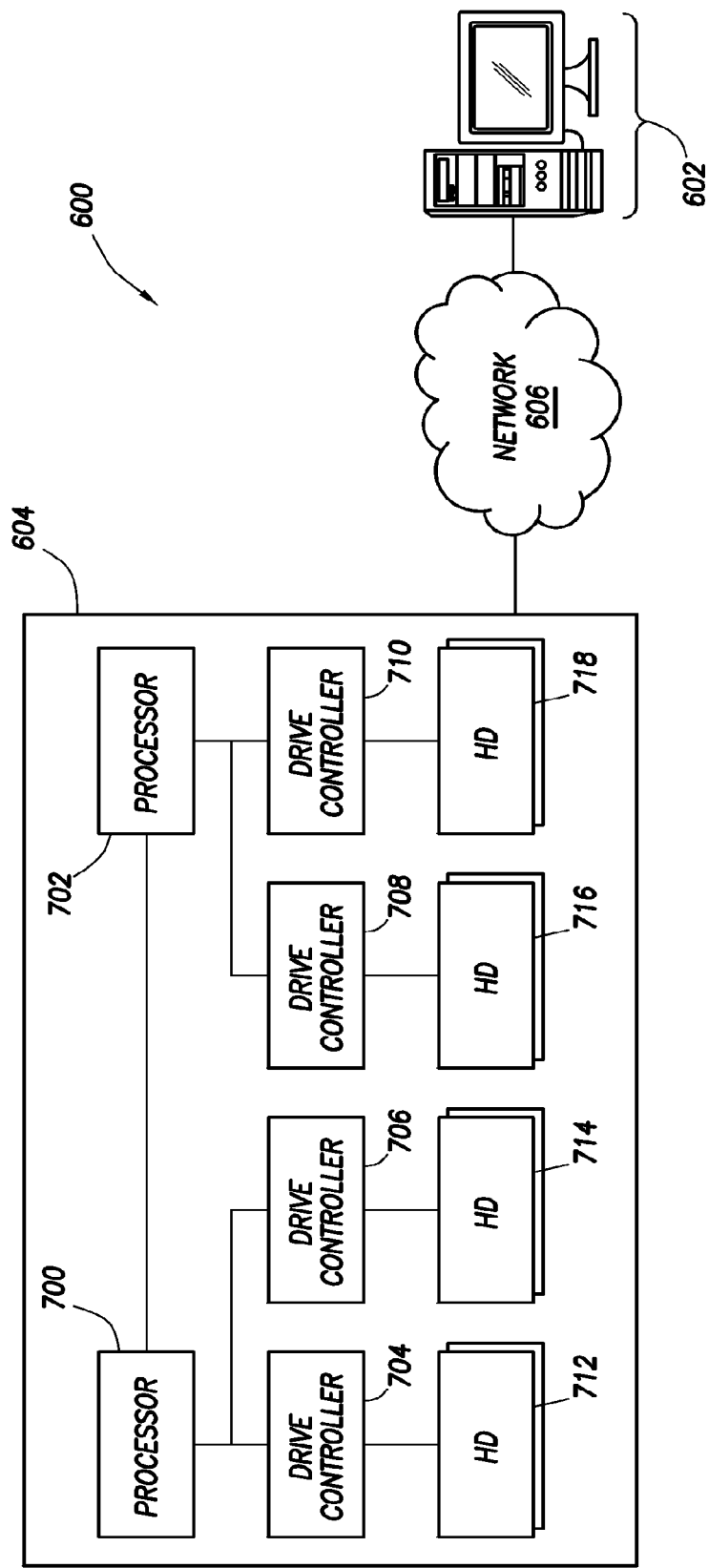
FIG. 12 shows a system in accordance with at least some embodiments.

FIG. 12 shows an another example system to implement the seismic data server 604. In the example system, the seismic data server 604 comprises a high-end file server with multiple processors, such as processor 700 and 702. While only two processors are shown in FIG. 12, any number of processors may be used. Each processor is coupled to a plurality of drive controllers. For example, processor 700 is coupled to drive controllers 704 and 706. Likewise, processor 702 is coupled to drive controllers 708 and 710. While each processor is shown coupled to two drive controllers, each processor may be coupled to one or more drive controllers. Each drive controller couples to at least one, and in some cases several, disk drives. In the example system, drive controller 704 couples to disk drives 712, drive controller 706 couples to disk drives 714, drive controller 708 couples to disk drives 716, and drive controller 710 couples to disk drives 718.

Although there are several example variations of how the seismic data server 604 may store a seismic data volume, consider a first example in which each disk drive stores a portion of the seismic data volume, and where the data server 604 has knowledge of where each portion of the seismic data volume is stored.

Operation of the data server 604 in FIG. 12 is similar to the operation of the data server 604 in FIG. 6 in the sense that the data server receives a query from the client computer system 602. Based on the data within the payload portion of the query, the data server 604 ascertains the orientation of the seismic data slice 700, and then the data server 604 reads data groups from the seismic data volume. In the example case where the seismic data volume is spread across the disk drives, the data server 604 creates a plurality of read requests, and sends the read requests to the appropriate drive controllers 704-710. In the example system, each read request is to read a particular memory location in the linear array of memory locations. For example, multiple threads executing on each of the processors 700 and 702 may make requests to the drive controllers for specific data bytes. What each processor gets in reply is (as discussed with respect to cache operations) an entire cache line of data that comprises not only the requested datum, but also datums that do not reside in the seismic data slice. Thus, for each data group read, each thread executed on each processor 700 and 702 saves the requested datum, and discards the plurality of datums that do not reside in the seismic data slice. In some cases, discarding is performed inherently as a subsequent cache miss.

The example steps of saving the requested datum, and discarding the rest, are repeated until each datum associated with the seismic data slice is assembled. Thereafter, the data server 604 sends the response to the client computer system 602. In some cases, the data server 604 may begin sending the responses before completely assembling the data associated with the seismic data slice. For example, if the payload is of limited size, as soon as a sufficient number of data have been received, a first response can be sent.

In yet still other cases, rather than the threads executing at the processor making requests for individual bytes from each of the drive controllers 704-710, the data server 604 may instead forward the query that defines the seismic data slice (including, for example, the three or more corners) to each drive controller 704-710. In these example embodiments, each respective drive controller may determine which portions (if any) of the seismic data slice reside in the portions of the overall seismic data volume contained in the directly attached disk drives. Thus, in these embodiments drive controllers perform the example steps of saving requested datums, and discarding the rest.

As before, by having the work of gathering the data of the seismic data slice 700 spread across multiple logical components (e.g., across a plurality threads executed within the data server 604), the cache thrashing issues are not resolved (at the seismic server 604 end), but the parallel processing of requests in combination with a delivery technique that reduces or obviates cache thrashing in the client computer 602 results in a system where the seismic data slices may be rendered at interactive frame rates on at the client computer system 602 in spite of cache thrashing issues that may exist within seismic data server 604.

In yet still other cases, each disk drive 712-718 could store a complete copy of the seismic data volume 200. In this example system, the threads executing on the processors 700 and 702 may formulate reads for data groups, and scatter those reads in any suitable fashion to the downstream drive controllers 704-710. Moreover, the same overall seismic data volume 200 may be logically organized as vertical layers, or layers of any orientation. In situations where seismic data slices of vertical orientation are expected, the logical orientation of the seismic data volume 200 may be stored as vertical layers, such that reads by the threads executing on the processors 700 and 702 may take advantage of the receiving multiple bytes of data in each cache line. In such a system, where the seismic data slice 700 substantially matches a vertically oriented logical layer, the frame rate achievable at the client computer system 602 may be increased.

In yet still further example systems, some of the hard disks may store versions of the seismic data volume 200 logically organized as horizontal layers, and some of the hard disks may store versions of the seismic data volumes 200 organized as vertical layers, and the data server 604 may select to which drive controllers 704-710 from which to read data groups that takes advantage of the of the correspondence between the orientation of the seismic data slice and the logical organization of the layers of the versions of the seismic data volumes.

Any or all of the embodiments that involve use of a user interface, or a computer system to perform functions, may be implemented on a computer system such as that shown in FIG. 1.

Example Methods

Figure 13:
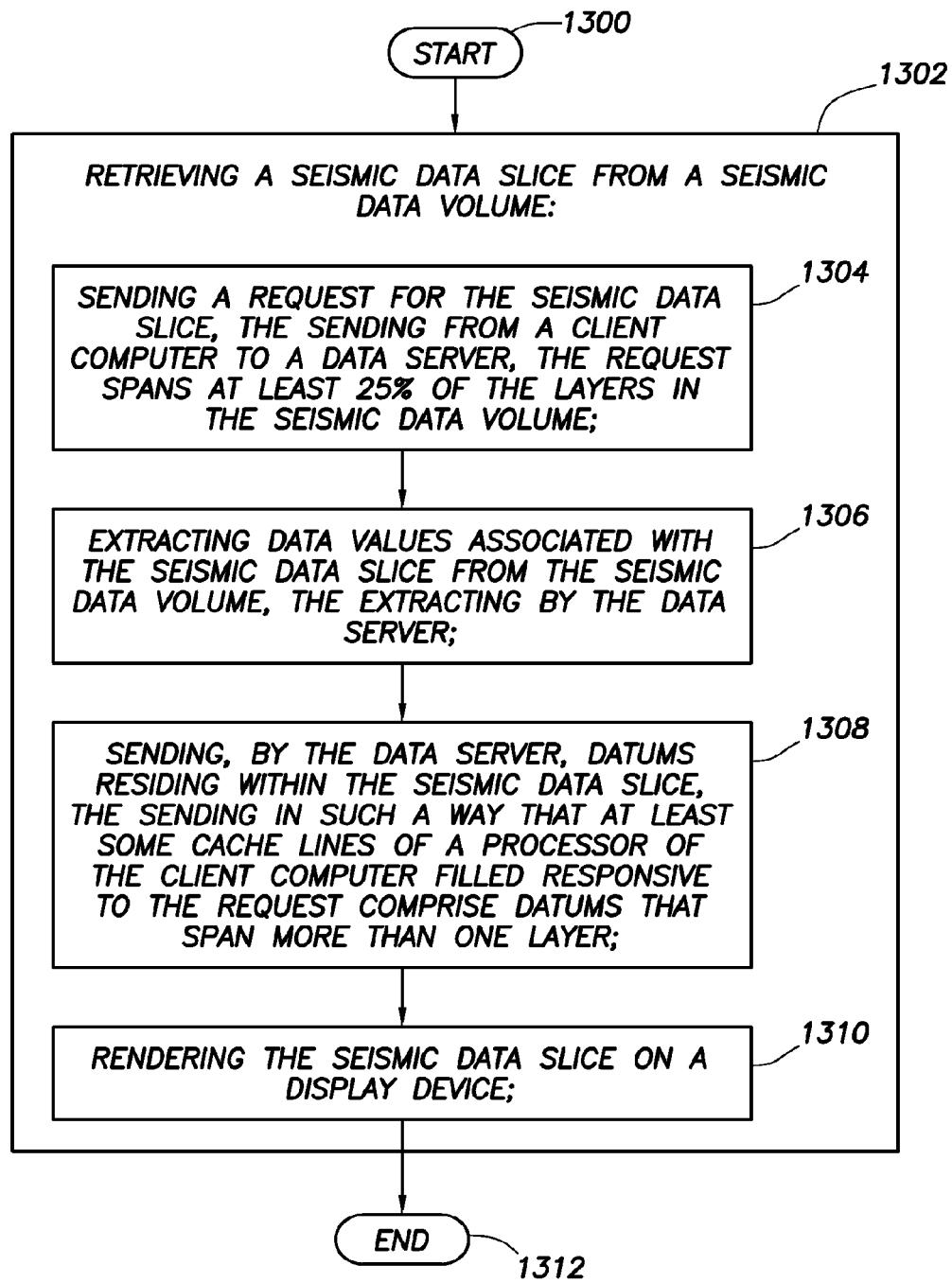
FIG. 13 shows a method in accordance with at least some embodiments.

FIG. 13 shows a method in accordance with at least some embodiments. In particular, the method starts (block 1300) and comprises retrieving a seismic data slice from a seismic data volume (block 1302). In some cases, retrieving a seismic data slice may comprise sending a request for the seismic data slice from a client computer to a data server, where the request spans at least 25% of the layers present in the seismic data volume (block 1304). The method may then comprise extracting data values associated with the seismic data slice from the seismic volume, where the extracting is accomplished by the data server (block 1306). After the data values have been extracted, the data server may send data residing within the seismic data slice in such a way that at least some cache lines of the processor of the client computer which are filled responsive to the request comprises data that spans more than one layer in the seismic volume (block 1308). After the data server sends datums residing within the seismic data slice, the seismic data slice is rendered on a display device (block 1310). Thereafter, the method ends (block 1312).

Figure 14:
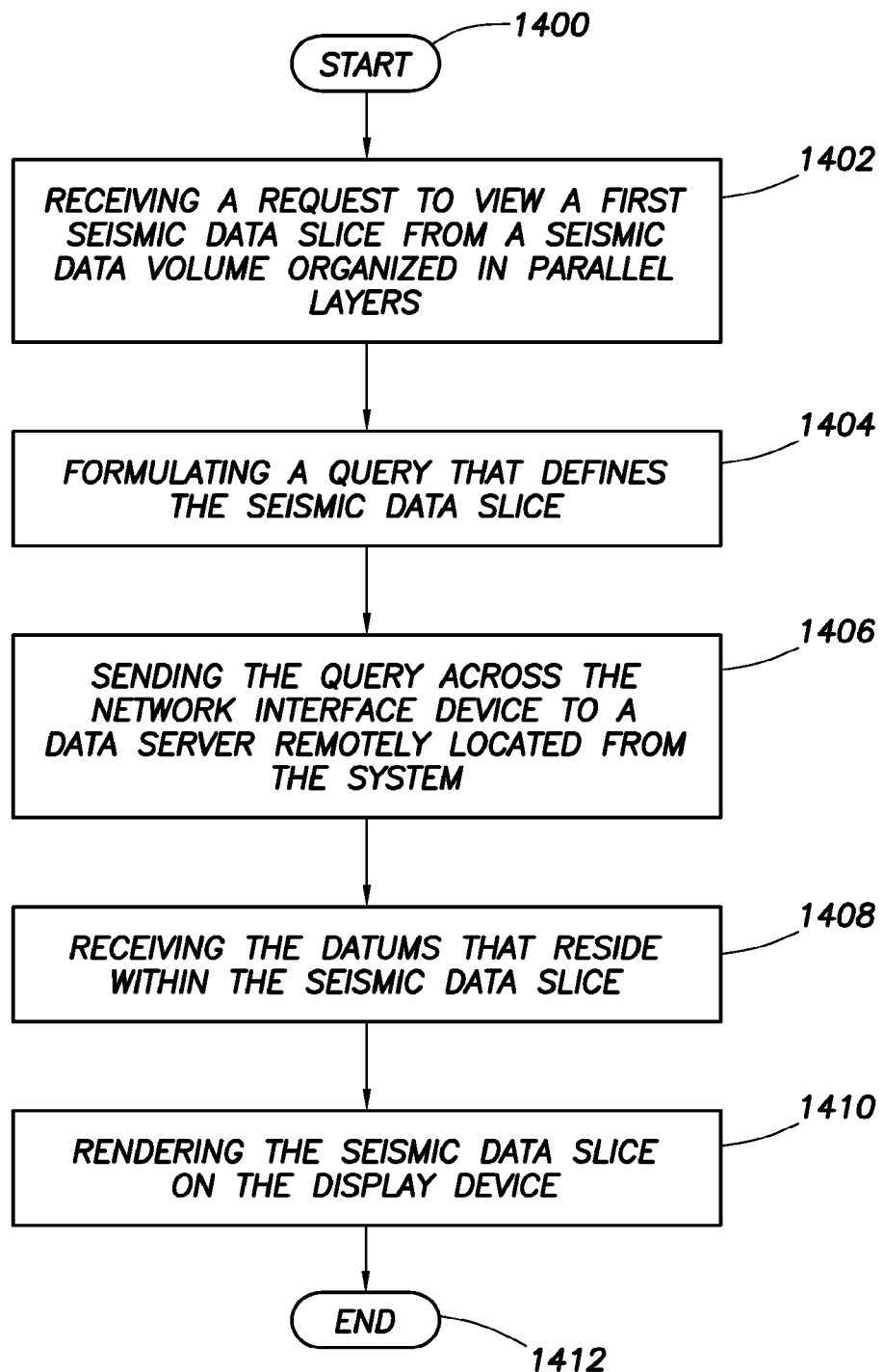
FIG. 14 shows a method in accordance with at least some embodiments.

FIG. 14 shows a method in accordance with at least some embodiments. In particular, the method starts (block 1400) and comprises receiving a request to view a first seismic data slice from a seismic data volume organized in parallel layers (block 1402). The method then moves to formulating a query that defines the seismic data slice (block 1404). The method may then comprise sending the query across the network interface device to a data server remotely located from the system (block 1406). After sending the query, the data server receives the datums that reside within the seismic slice (block 1408) and then renders the seismic data slice on a display device (block 1410). Thereafter, the method ends (block 1412).

Figure 15:
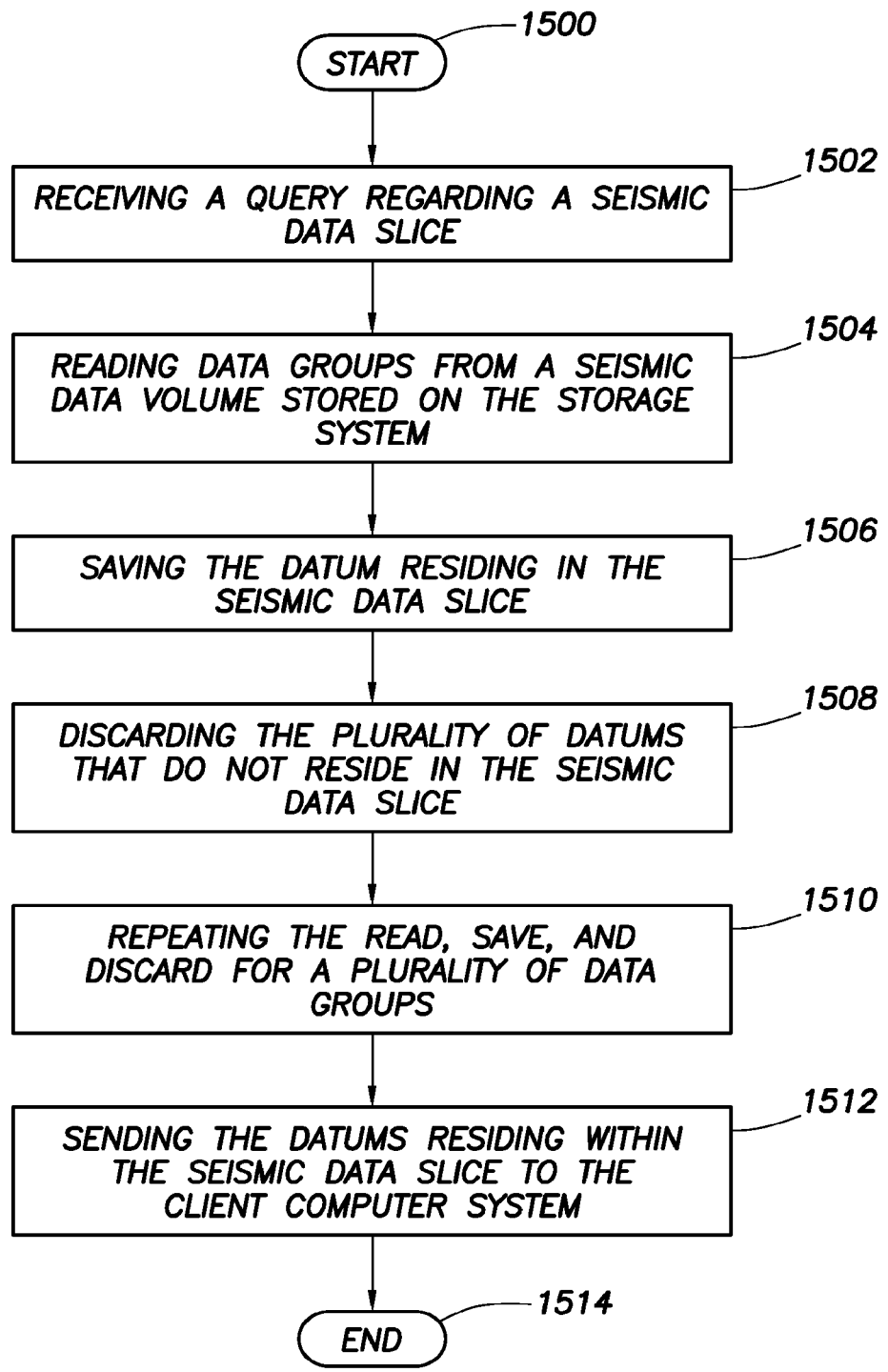
FIG. 15 shows a method in accordance with at least some embodiments.

FIG. 15 shows a method in accordance with at least some embodiments. In particular, the method starts (block 1500) and comprises receiving a query regarding a seismic data slice (block 1402). The method may then comprise reading data groups from a seismic data volume stored on a storage system (block 1504). The method then moves to saving the datum residing in the seismic data slice (block 1406) and then to discarding the plurality of datums that do not reside in the seismic data slice (block 1508). The reading, saving and discarding for a plurality of data groups is repeated (block 1510), and then the method moves to sending the datums residing within the seismic data slice to the client computer system (block 1512). Thereafter, the method ends (block 1514).

The above discussion is meant to be illustrative of the principles and various embodiments of retrieving a data portion related to a seismic data volume by way of sending a request to a data server. Numerous variations and modifications will become apparent to those skilled in the art once the above disclosure is fully appreciated. For example, a seismic data slice need not span an entire seismic data volume—seismic data slices may form planes yet still represent an overall size smaller than a complete slice through the seismic data volume. It is intended that the following claims be interpreted to embrace all such variations and modifications.

We claim:

1. A method comprising:
   retrieving a seismic data slice from a seismic data volume, datums of the seismic data volume logically organized in parallel layers, the retrieving by:
      sending a request for the seismic data slice, the sending from a client computer to a data server over a network connection, the request spans at least twenty-five percent (25%) the layers in the seismic data volume, and the data server is remotely located from the client computer;
      extracting data values associated with the seismic data slice from the seismic data volume, the extracting by the data server;
      sending, by the data server, datums residing within the seismic data slice, the sending in such a way that at least some cache lines of a processor of the client computer filled responsive to the request comprise datums that span more than one layer; and then
      rendering the seismic data slice on a display device of the client computer.

2. The method of claim 1 wherein the sending further comprises sending datums residing in the seismic data slice in such a way that at least some cache lines filled responsive to the request comprising substantially only datums from the seismic data slice.

3. The method of claim 1 wherein sending by the data server comprises:
   reading data groups from long term storage, each data group comprising a datum residing in the seismic data slice and a plurality of datums that do not reside in the seismic data slice;
   saving the datum residing in the seismic data slice;
   discarding the plurality of datums that do not reside in the seismic data slice;
   repeating the reading, saving, and discarding for a plurality of data groups; and then
   sending the datums residing within the seismic data slice.

4. The method of claim 3 wherein reading data groups further comprises:
   reading a firstly plurality of data groups from a first long term storage device, the first long term storage device comprising a first portion of the seismic data volume; and
   reading a second plurality of data groups from a second long term storage device comprising a second portion of the seismic data volume, the second long term storage device distinct from the first long term storage device, the second portion of the seismic data volume distinct from the first portion of the seismic data volume, and the second plurality of data groups distinct from the first plurality of data groups.

5. The method of claim 4 wherein reading the first plurality of data groups and reading the second plurality of data groups occurs simultaneously.

6. The method of claim 3 wherein reading data groups further comprises:
   reading a firstly plurality of data groups from a first long term storage device, the first long term storage device storing a first copy of the seismic data volume; and
   reading a second plurality of data groups from a second long term storage device comprising a second copy of the seismic data volume.

7. The method of claim 3 wherein reading data groups further comprises:
   determining an orientation of the seismic data slice;
   selecting a version of the seismic data volume from a plurality of seismic data volumes, each seismic data volume logically organized in parallel layers of different orientation; and
   reading the data groups from the version of the seismic data volume.

8. The method of claim 1 wherein sending the request further comprises sending at least three data points, the at least three data points define a plane that is non-parallel to the parallel layers.

9. The method of claim 1 further comprising repeating the retrieving for a plurality of seismic data slices, the retrieving performed at an interactive frame rate.

* * * * *